United States Patent
Nakayama et al.

(10) Patent No.: US 7,338,984 B2
(45) Date of Patent: Mar. 4, 2008

(54) RESIN COMPOSITION CONTAINING ULTRAFINE INORGANIC PARTICLE

(75) Inventors: Norio Nakayama, Sodegaura (JP); Tomonori Iijima, Sodegaura (JP); Toyoharu Hayashi, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 351 days.

(21) Appl. No.: 10/522,034

(22) PCT Filed: Jul. 17, 2003

(86) PCT No.: PCT/JP03/09064

§ 371 (c)(1), (2), (4) Date: Jan. 21, 2005

(87) PCT Pub. No.: WO2004/009659

PCT Pub. Date: Jan. 29, 2004

(65) Prior Publication Data

US 2005/0261406 A1    Nov. 24, 2005

(30) Foreign Application Priority Data

Jul. 22, 2002 (JP) .............................. 2002-212862
Feb. 28, 2003 (JP) .............................. 2003-053696

(51) Int. Cl.
*C08F 2/46* (2006.01)
*C09D 133/14* (2006.01)
*B32B 27/08* (2006.01)
*B32B 27/30* (2006.01)

(52) U.S. Cl. .................. 522/36; 522/83; 522/173; 522/180; 522/64; 428/419; 428/423.1

(58) Field of Classification Search ................ 524/847; 522/83, 180, 36, 64, 173; 428/419, 423.1
See application file for complete search history.

(56) References Cited

U.S. PATENT DOCUMENTS

| | | | |
|---|---|---|---|
| 5,214,116 A * | 5/1993 | Matsuoka et al. | 526/286 |
| 5,518,789 A * | 5/1996 | Burns et al. | 428/825 |
| 5,741,831 A * | 4/1998 | Keita et al. | 523/106 |
| 5,908,876 A * | 6/1999 | Fujii et al. | 522/142 |
| 6,551,710 B1 * | 4/2003 | Chen et al. | 428/412 |
| 6,844,950 B2 * | 1/2005 | Ja Chisholm et al. | 359/456 |
| 6,887,402 B2 * | 5/2005 | Klemm et al. | 264/1.24 |

FOREIGN PATENT DOCUMENTS

| | | |
|---|---|---|
| EP | 0 378 895 A1 | 7/1990 |
| EP | 0 730 168 A2 | 9/1996 |
| EP | 0 942 027 A2 | 9/1999 |
| JP | 8-179123 A | 7/1996 |
| JP | 8-295665 A | 11/1996 |
| JP | 9-110956 A | 4/1997 |
| JP | 9-124592 A | 5/1997 |
| JP | 9-132563 A | 5/1997 |
| JP | 9-309923 A | 12/1997 |
| JP | 10-171117 A | 6/1998 |
| JP | 2001-49148 A | 2/2001 |
| JP | 2002-194083 A | 7/2002 |

\* cited by examiner

*Primary Examiner*—Susan W. Berman
(74) *Attorney, Agent, or Firm*—Buchanan Ingersoll & Rooney PC

(57) ABSTRACT

By providing a composition in which refractive index can be controlled, and scratch resistivity and adhesion (especially adhesion to a resin having a thiourethane bond or epithiosulfide bond) are excellent when the composition is coated on a base material such as a resin and then cured, the composition comprises (a) a thio(meth)acrylate compound represented by the general formula (1) and (b) ultrafine inorganic particles:

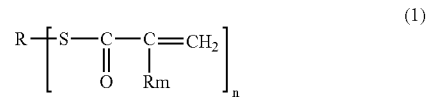

wherein a linking(or connecting) group R represents an aliphatic residue, an aromatic residue, an alicyclic residue or a heterocyclic residue or an aliphatic residue having an oxygen atom, a sulfur atom, an aromatic ring, an aliphatic ring, or a heterocycle in the chain; $R_m$ represents each independently a hydrogen atom or a methyl group; and n is an integer of 1 to 4.

8 Claims, No Drawings

RESIN COMPOSITION CONTAINING ULTRAFINE INORGANIC PARTICLE

TECHNICAL FIELD

The present invention relates to a resin composition comprising ultrafine inorganic particles, and a coating agent and optical material comprising the composition.

BACKGROUND ART

Plastic lenses have rapidly come into wise use as lens materials for example, pickup lenses used for devices for spectacles, cameras, optical recording and reproduction instead of glass lenses in view of lightweight, impact resistance, Tintability(Dyeability) and the like. So, radical-polymerized polymer of diethylene glycol bis(allylcarbonate) (hereinafter, D.A.C.) polycarbonate (PC), polymethyl (meth)acrylate (PMMA) and the like have been used for plastic lenses. These plastic lenses have a drawback in that they might be easily scratched as compared to glasses. As one of measures to handle such a drawback, there was mentioned of a method for curing a multifunctional (meth) acrylate with ultraviolet rays (UV), thus forming a tight and hard layer (hard coatings or Abrasion-resistant coatings) on the surface of a lens.

On the other hand, in order to reduce the thickness of a lens, resins having much higher refractive index have been required instead of resins such as D.A.C., PC, PMMA and the like having the refractive index of around $n_d$=1.49 to 1.58. There have been proposed a resin (around $n_d$=1.60 to 1.67) which was obtained by forming a thiourethane bond by thermo-polymerization of a thiol compound and isocyanate compound in JP97-110956A, and a resin ($n_d$=1.70 or more) which was obtained by forming an epithiosulfide bond by ring opening thermo-polymerization of a thio epoxy compound in JPO2-194083A.

Accompanied with diversity in plastic lenses, especially high refractive index, a demand for hard coatings has been diversified. In addition to characteristics requiring sufficient scratch resistivity and adherence to a lens, recently, it has been strongly required that no interference fringe was generated between the lens surface and hard coatings (refractive indexes of both materials adjusted).

These characteristics for adjusting the refractive index of a base material including an optical material are not only required for hard coatings of a lens, but strongly required for a wide variety of fields ranging to surface decoration of resin materials, metal materials, ceramic materials, glass materials and the like or adhesive agents, in view of anti-reflection for displays, surface protection for optical recording media aesthetically.

However, it is currently difficult to realize hard coatings that satisfy other requirement characteristics (scratch resistivity, adherence and the like) and in which the refractive index can be adjusted and especially higher refractive index can be obtained as well.

In JP96-179123A, there has been described a method of curing a composition comprising multifunctional acrylate and a kind of ultrafine inorganic oxide particles having high refractive index selected from antimonous oxide, tin oxide, indium-tin mixed oxide, cerium oxide, titanium oxide with ultraviolet rays.

However, as the refractive index of an aliphatic (meth) acrylate such as pentaerythritol triacrylate described in the document or the like is 1.5 or less by nature, in order to obtain high refractive index of more than 1.6 and more than 1.7, a lot of ultrafine inorganic oxide particles having high refractive index should be contained. As a result, a coating layer becomes weakened. Furthermore, when a composition having these aliphatic (meth)acrylate compounds as main components is used as hard coatings for lenses, as adherence to a resin having the aforementioned thiourethane bond or epithiosulfide bond is not sufficient, it can not be used.

Also, a method (sol-gel method) of forming hard coatings by thermal-curing of a silane coupling agent as a main component has been widely used, in which scratch resistivity was extremely high with certainty, and adherence to a resin having a thio urethane bond or epithiosulfide bond was sufficient as well. This method, however, had drawbacks in that heating conditions such as high temperature and long time were required for forming hard coatings and storage stability of a solution was usually within 1 month.

As a method to form high refractive index layer (film) on the surface of a resin or glass, there has been a physical method to form a layer such as titanium oxide, zirconium oxide and the like using vacuum evaporation, sputtering or the like. However, this method has problems in productivity in view of film production speed or the like, and allows a thin layer of about several nms, but it is practically difficult to form a thick layer having about several μms.

DISCLOSURE OF THE INVENTION

An object of the present invention is to provide a composition in which the refractive index can be controlled according to a base material and hard coatings superior in scratch resistivity and adherence (especially adherence to a resin having a thio urethane bond or an epithiosulfide bond) can be simply formed.

In order to solve the aforementioned problems, the present inventors have repeatedly studied and found that a composition comprising (a) a thio(meth)acrylate compound represented by the general formula (1) and (b) ultrafine inorganic particles as essential components was a solution to the above problems and further found that a coating solution comprising the composition was excellent in storage stability, thus easily forming a transparent coat layer having a thickness of several nms to several Elms or more on a base material.

Furthermore, they have found, that by further adding (c) a (meth)acrylate compound having a (thio)urethane bond, adherence (especially adherence to a resin having a thiourethane bond or epithiosulfide bond), surface hardness, scratch resistivity were further improved and when (d) a hydroxyl group-containing (meth)acrylate compound and (e) β-diketone compound were added, they could be used without substantially adding a solvent so effect to the human body or environment became smaller and a relatively thick molded product could be obtained at the same time, thus completing the present invention.

Namely, the present invention relates to:

(1) a composition comprising (a) a thio(meth)acrylate compound represented by the general formula (1) and (b) ultrafine inorganic particles:

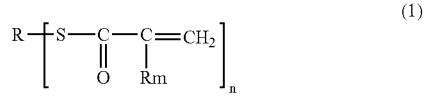

wherein a linking(or connecting) group R represents an aliphatic residue, an aromatic residue, an alicyclic residue or a heterocyclic residue or an aliphatic residue having an oxygen atom, a sulfur atom, an aromatic ring, an aliphatic ring, or a heterocycle in the chain; $R_m$ represents each independently a hydrogen atom or a methyl group; and n is an integer of 1 to 4;

(2) The composition according to (1), wherein a linking group R in the general formula (1) is represented by one of the following formulae (2) to (6):

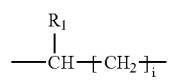
(2)

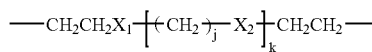
(3)

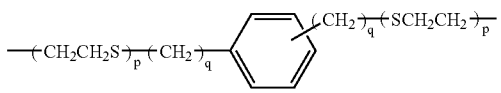
(4)

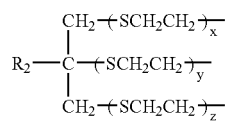
(5)

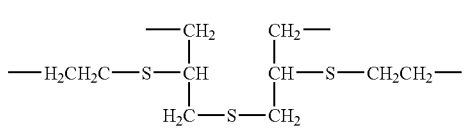
(6)

wherein $R_1$ represents a hydrogen atom or a methyl group; $R_2$ represents a hydrogen atom, a methyl group or an ethyl group; $X_1$ and $X_2$ represent oxygen atoms or sulfur atoms; i is an integer of 1 to 5; j is an integer of 0 to 2; k, p, q, x, y and z are 0 or 1 respectively;

(3) The composition according to (1) or (2), further comprising (c) a (meth)acrylate compound having a (thio)urethane bond;

(4) The composition according to any one of (1) to (3), further comprising (d) one or more hydroxyl group-containing (meth)acrylate compounds represented by the general formulae (7) to (10) and (e) a β-diketone compound represented by the general formula (11):

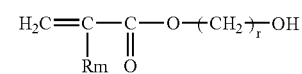
(7)

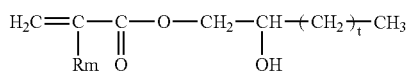
(8)

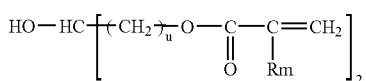
(9)

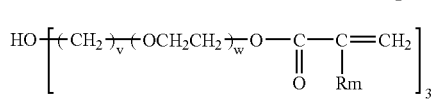
(10)

wherein $R_m$ represents a hydrogen atom or a methyl group; r and t are an integer of 1 to 4; u is each independently an integer of 1 to 4; v is each independently an integer of 1 to 4; and w is each independently an integer of 0 to 4:

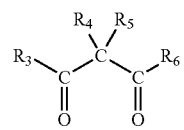
(11)

wherein $R_4$ and $R_5$ represent hydrogen atoms or such ones that one is a hydrogen atom and another is straight chain or branched $C_1$ to $C_4$ alkyl group; $R_3$ and $R_6$ represent hydrogen atoms or each independently a hydrogen atom, a C1 to C4 alkyl group, a hydroxyl group, an aliphatic residue, an aromatic residue, an alicyclic residue, a heterocyclic residue, or $C_1$ to $C_6$ alkyl group containing one or more ether groups, ester groups, thioester groups or ketone groups in the chain structure; or $R_3$ and $R_5$ may be combined together to form $C_5$ to $C_{10}$ rings which may be substituted with one or more $C_2$ to $C_4$ alkylene groups;

(5) The composition according to any one of (1) to (4), wherein a curing film having a coating layer thickness of 2 μm that the composition is coated on the surface of a resin plate having a thiourethane bond or an epithiosulfide bond and then cured with ultraviolet rays has (1) evaluation score of a cross-hatch, tape-peeling test (JIS-K5400) of 6 or more; and (2) pencil scratch test value (JIS-K5400) of 3H or more;

(6) a coating composition comprising the composition as described in any one of (1) to (5); and (7) an optical material comprising the composition as described in any one of (1) to (5) (there are mentioned usage for optical recording media, lenses, films, light guide plates, light scattering sheet, prism sheets, sealing materials, adhesives and the like)

BEST MODE FOR CARRYING OUT THE INVENTION

A composition for coating of the present invention comprises (a) thio(meth)acrylate compounds and (b) ultrafine inorganic particles, and can be easily formed into a coat layer in which high refractive index can be realized, and adherence and scratch resistivity are excellent.

(a) A thio(meth)acrylate compound used in the present invention is represented by the aforementioned general formula (1), or more preferably, wherein the linking group R is a group represented by any one of the aforementioned formulae (2) to (6). These thio(meth)acrylate compounds may be used in combination of one or two or more kinds according to the physical properties of a cured product.

A method for producing thio(meth)acrylate compounds is described in JP97-25264A. The compounds can be obtained by reacting a thiol compound with β-halo propionic acid halogen compound or α-methyl-β-halopropionic acid halogen compound in the absence of a base and then conducting the dehalogenation reaction. As the thio(meth)acrylate compound, compounds represented by the following formulae (12) to (16) can preferably be mentioned as thiol compounds can be more easily purchased:

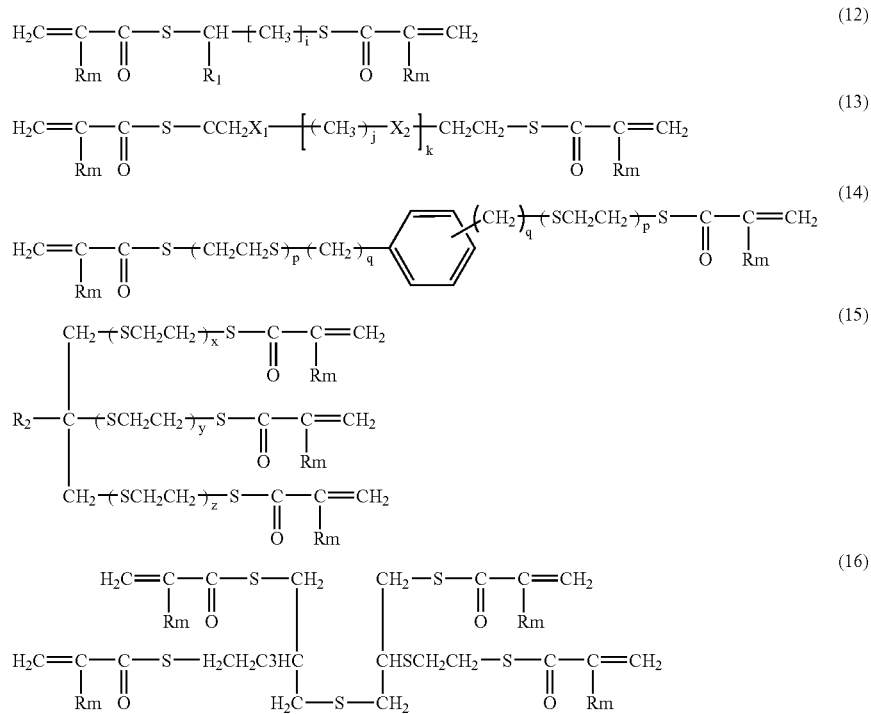

wherein $R_m$ represents each independently a hydrogen atom or a methyl group; $R_1$ represents a hydrogen atom or a methyl group; $R_2$ represents a hydrogen atom, a methyl group or an ethyl group; $X_1$ and $X_2$ represent oxygen atoms or sulfur atoms; i is an integer of 1 to 5; j is an integer of 0 to 2; and k, p, q, x, y and z represent 0 or 1 respectively.

As examples, there can be mentioned, more specifically, (meth)acryloylthiomethylbenzene, benzylthioethyl thio (meth)acrylate when n=1; 1,2-bis(meth)acryloylthioethane, 1,3-bis(meth)acryloylthiopropane, 1,4-bis(meth)acryloylthiobutane, 1,6-bis(meth)bisacryloylthiohexane, bis-2-(meth)acryloylthioethylether, bis-2-(meth)acryloylthioethyl sulfide, bis-2-(meth)acryloylthioethylthiomethane, 1,2-bis(meth)acryloylthiobenzene, 1,3-bis(meth)acryloylthiobenzene, 1,4-bis(meth)acryloylthiobenzene, 1,2-bis(meth)acryloylthiomethylbenzene, 1,3-bis(meth)acryloylthiomethylbenzene, 1,4-bis(meth)acryloylthiomethylbenzene, 1,2-bis(2-(meth)acryloylthioethylthio)methylbenzene, 1,3-bis(2-(meth)acryloylthioethylthio)methylbenzene, 1,4-bis(2-(meth)acryloylthioethylthio)methylbenzene when n=2; 1,2-bis(2-(meth)acryloylthioethylthio)-3-(meth)acryloylthiopropane, 1,2,3-tris(2-(meth)acryloylthioethylthio)propane when n=3; bis-(2-(meth)acryloylthioethylthio-3-(meth)acryloylthiopropane) sulfide when n=4; and the like.

A thiol compound used in production of a thio(meth)acrylate compound represented by the general formula (1) has an aliphatic residue, an aromatic residue, an alicyclic residue or a heterocyclic residue or an aliphatic residue having an oxygen atom, a sulfur atom, an aromatic ring, an aliphatic ring, or a heterocycle in the chain, and further comprises one or more mercapto groups. Specifically, as monothiol compounds (mercapto group: 1), there can be mentioned, methylmercaptan, ethylmercaptan, propylmercaptan, butylmercaptan, amylmercaptan, hexylmercaptan, heptylmercaptan, octylmercaptan, nonylmercaptan, cyclobentylmercaptan, cyclohexylmercaptan, furfurylmercaptan, thiophenol, thiocresol, ethylthiophenol, benzylmercaptan, benzylthioethylmercaptan; as polythiol compounds (mercapto group: 2 to 4), there can be mentioned 1,2-ethanedithiol, 1,2-propanedithiol, 1,3-propanedithiol, 1,4-butanedithiol, 1,6-hexanedithiol, 1,2,3-propane trithiol, 1,1-cyclohexanedithiol, 1,2-cyclohexanedithiol, bicyclo[2,2,1]hepta-exo-cis-2,3-dithiol, 1,1-bis(mercaptomethyl)cyclohexane, diethylene glycol bis(2-mercaptoacetate), diethylene glycol bis(3-mercapto propionate), bis(2-mercapto ethyl)ether, ethylene glycol bis(2-mercaptoacetate), ethylene glycol bis(3-mercapto propionate), trimethylolpropane bis(2-mercaptoacetate), trimethylol propane bis(3-mercapto propionate), pentaerythritol tetrakis(2-mercaptoacetate), pentaerythritol tetrakis(3-mercapto propionate), 1,2-dimercapto benzene, 1,3-dimercapto benzene, 1,4-dimercapto benzene, 1,2-bis(mercaptomethyl)benzene, 1,3-bis(mercaptomethyl)benzene, 1,4-bis(mercaptomethyl)benzene, 1,2-bis(2-mercaptoethyl)benzene, 1,3-bis(2-mercaptoethyl)benzene, 1,4-bis(2-mercaptoethyl)benzene, 1,2-bis(2-mercaptoethyleneoxy)benzene, 1,3-bis(2-mercaptoethyleneoxy)benzene, 1,4-bis(2-mercaptoethyleneoxy)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(2-mercaptoethyl)benzene, 1,2,4-tris(2-mercaptoethyl)benzene, 1,3,5-tris(2-mercaptoethyl)benzene, 1,2,3-tris(2-mercaptoethyleneoxy)benzene, 1,2,4-tris(2-mercaptoethyleneoxy)benzene, 1,3,5-tris(2-mercaptoethyleneoxy)benzene, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(2- mercaptoethyl)benzene, 1,2,3,5-tetrakis(2-mercaptoethyl) benzene, 1,2,4,5-tetrakis(2-mercaptoethyl)benzene, 1,2,3,4-tetrakis(2-mercaptoethyleneoxy)benzene, 1,2,3,5-tetrakis(2-mercaptoethyleneoxy)benzene, 1,2,4,5-tetrakis(2-mercaptoethyleneoxy)benzene, 2,2'-dimercaptobiphenyl, 4,4'-thiobis-benzenethiol, 4,4'-dimercaptobiphenyl, 4,4'-dimercapto bibenzyl, 2,5-toluenedithiol, 3,4-toluenedithiol, 1,4-naphthalenedithiol, 1,5-naphthalenedithiol, 2,6-naphthalenedithiol, 2,7-naphthalenedithiol, 2,4-dimethylbenzene-1,3-dithiol, 4,5-dimethylbenzene-1,3-dithiol, 9,10-anthracene dimethanethiol, 1,2-bis(2-mercaptoethylthio) benzene, 1,3-bis(2-mercaptoethylthio)benzene, 1,4-bis(2-meraptoethylthio)benzene, 1,2-bis(2-mercaptoethylthiomethyl)benzene, 1,3-bis(2-mercaptoethylthiomethyl)benzene, 1,4-bis(2-mercaptoethylthiomethyl)benzene, 1,2,3-tris(2-mercaptoethylthio)benzene, 1,2,4-tris(2-mercaptoethylthio) benzene, 1,3,5-tris(2-mercaptoethylthio)benzene, 1,2,3,4-tetrakis(2-mercaptoethylthio)benzene, 1,2,3,5-tetrakis(2-mercaptoethylthio)benzene, 1,2,4,5-tetrakis(2-mercaptoethylthio)benzene, bis(2-mercaptoehtyl)sulfide, bis (2-mercpatoethylthio)methane, 1,2-bis(2-mercaptoethylthio)ethane, 1,3-bis(2-mercaptoethylthio) propane, 1,2,3-tris(2-mercaptoethylthio)propane, tetrakis(2-mercaptoethylthiomethyl)methane, 1,2-bis(2-mercaptoethylthio)propanethiol, 2,5-dimercapto-1,4-dithian, bis(2-mercpatoethyl)disulfide, 3,4-thiophenedithiol, 1,2-bis(2-mercaptoethyl)thio-3-mercaptopropane, bis-(2-meraptoethylthio-3-mercaptopropane)sulfide and the like.

Also, as β-halopropionic acid halogen compound or α-methyl-β-halopropionic acid halogen compound, there can be mentioned, specifically, acyl chlorides such as β-chlolo propionic acid, β-bromo propionic acid, α-methyl -β-chlolo propionic acid, and the like; and acyl bromides. However, acyl chlorides such as β-chlolo propionic acid and α-methyl-β-chloro propionic acid are more properly used in view of reactivity and the like.

The refractive index can be controlled by adjusting the amount of a thio(meth)acrylate compound in (meth)acrylate compounds contained in a composition. In the weight of (meth)acrylate compound, a thio(meth)acrylate compound is preferably more than 1 weight %, more preferably more than 5 weight %, and further preferably more than 10 weight %.

As (b) ultrafine inorganic particles, metal chalcogen compounds such as metal oxide, metal sulfides and the like; or metal fluorides are preferable. Specifically, such particles include titanium oxide, zirconium oxide, indium oxide, zinc oxide, selenium oxide, antimonous oxide, tin oxide, lanthanium oxide, neodymium oxide, silicon dioxide, ammonium oxide, zinc sulfide, antimonous sulfide, neodymium fluoride, lanthanium fluoride, magnesium fluoride, sodium fluoride, calcium fluoride, lithium fluoride and the like. By properly adjusting kinds of ultrafine particles and its mixing amount according to usage, purposes and the refractive index of a coating resin, the refractive index can be controlled.

Specifically, in order to increase the refractive index, ultrafine inorganic particles having high refractive index are combined. In order to realize the refractive index of particularly 1.7 or more, the refractive index is preferably 1.8 or more in a wavelength of 546 nm. Specifically, such particles include ultrafine particles containing one or more components of titanium oxide, zirconium oxide, indium oxide, zinc oxide, selenium oxide, antimonous oxide, tin oxide, lanthanium oxide, neodymium oxide, zinc sulfide and antimonous sulfide, and preferably containing one or more components of titanium oxide, zirconium oxide, zinc oxide, antimonous oxide, tin oxide and zinc oxide.

On the contrary, when a composition is used for anti-reflection or an adhesive for junction of optical materials and the refractive index of the composition is adjusted to be lowered, ultrafine inorganic particles having refractive index of 1.6 or less lower than that of a thio(meth)acrylate may be combined, which specifically include silicon dioxide, neodymium fluoride, lanthanium fluoride, magnesium fluoride, sodium fluoride, calcium fluoride and the like.

Incidentally, when an object is to secure transparency of a resin that is subject to coating and the like, the average transparency for a coating layer having a thickness of 2 μm in a wavelength of 400 to 600 nm is preferably 80% or more, and more preferably 90% or more.

Ultrafine inorganic particles containing two or more components specifically refer to particles forming a structure (core-shell structure) coated with one or more kinds of other inorganic substances on the surface of a kind of ultrafine inorganic particle or a crystal structure consisting of two or more components.

The particle diameter of ultrafine inorganic particles is preferably 1 to 50 nm, more preferably 1 to 20 nm, and further preferably 1 to 10 nm. When the particle diameter is greater than 50 nm, it is difficult to obtain a transparent coat layer due to diffusion by particles. When the particle diameter is smaller than 1 nm, it is difficult to improve the refractive index.

Also, a method for producing ultrafine inorganic particles can be largely divided into a trituration method and a synthetic method. Furthermore, the synthetic method includes a gas phase method such as a evaporation-condensation method, a gas phase reaction method and the like, while a liquid phase method includes a colloid method, a homogeneous precipitation method, a hydrothermal synthetic method, a micro-emulsion method and the like.

A method for producing ultrafine inorganic particles used in the present invention is not particularly restricted, but production by the synthetic method is preferable from the viewpoints of the particle diameter, uniformity of a composition, impurities and the like.

It is preferable that each of ultrafine inorganic particles is dispersion-stabilized in a solvent, water or the like, and then a coating agent is produced. As far as the refractive index is not much reduced, dispersion-stabilized ones are properly used in a method of adding silane coupling agents such as γ-glycidoxypropyl trimethoxy silane, (meth)acryloyloxy propyl trimethoxy silane, mercaptopropyl trimethoxy silane and the like; organic acids such as carboxylic acid and the like; and polymers such as polyvinyl pyrrolidone, polyvinyl alcohol and the like or a method of chemically bonding (surface modification) them on the surface of particles.

The amount of ultrafine inorganic particles used is 1 to 400 weight parts to the total 100 weight parts of (meth) acrylate compounds contained in a composition, preferably 5 to 300 weight parts, and more preferably 10 to 200 weight parts.

When the amount of ultrafine particles is small, it is difficult to expect an increase of the refractive index. On the contrary, if the amount is high(or large), defects occur on the coating layer or adherence to a base material is damaged. Incidentally, ultrafine inorganic particles may be used singly or in combination of 2 or more kinds as well. Also, two or more particles having different shape and particle diameter but the same components may be combined.

By further adding (c) a (meth)acrylate compound having a (thio) urethane bond to a composition comprising (a) a thio(meth)acrylate compound and (b) ultrafine inorganic particles, adherence to a resin, i.e., adherence especially even to a resin having a thiourethane bond or an epithiosulfide bond is improved, and surface hardness and scratch resistivity are improved as well.

(c) A (meth)acrylate compound having a (thio)urethane bond can be obtained by the reaction between diiso(thio) cyanate and hydroxy(meth)acrylate. There can be mentioned, specifically, a urethane (meth)acrylate oligomer and the like which can be obtained by the reaction in combination of each of propane diiso(thio)cyanate, hexamethylene diiso(thio)cyanate, isophorone diiso(thio)cyanate, methylene bis(cyclohexyl iso(thio)cyanate), trimethyl hexamethylene diiso(thio)cyanate, tolylene diiso(thio)cyanate, 4,4-diphenylmethane diiso(thio)cyanate, xylene diiso(thio) cyanate, norbornene diiso(thio)cyanate, methyl norbornene diiso(thio)cyanate as diiso(thio)cyanate; 2-hydroxyethyl (meth)acrylate, 2-hydroxypropyl acrylate, glycidol methacrylate, pentaerythritol tri(meth)acrylate, pentaerythritol tetra(meth)acrylate, ethylene glycol, polyethylene glycol, polypropylene glycol, polytetramethylene glycol and the like as hydroxy(meth)acrylate.

Among these, in order to enhance the hardness after curing, a functional group is preferably bi- or higher functional group, more preferably tri- or higher functional group. It is particularly preferable if pentaerythritol tri(meth)acrylate is used for a hydroxy(meth)acrylate.

Incidentally, these (meth)acrylate compounds having a (thio)urethane bond may be used in combination of one or more than two kinds according to the physical properties of cured products.

The desirable ratio for each component, i.e., (a) a thio (meth)acrylate compound, (b) ultrafine inorganic particles and (c) a (meth)acrylate compound having a (thio)urethane bond in the composition is in the following range in view of the surface hardness, adherence and the like.

(i) (a):(c) is 1 weight %: 99 weight % to 99 weight %: 1 weight %, preferably 5 weight %: 95 weight % to 95 weight %: 5 weight %, and more preferably 10 weight %: 90 weight % to 90 weight %: 10 weight %.

(ii) (b)/((a)+(b)+(c)) is more than 1 weight % and less than 90 weight %, preferably more than 5 weight % and less than 80 weight %, and more preferably more than 10 weight % and less than 70 weight %.

Also, when the amount of ultrafine inorganic particles is small in the composition having a thio(meth)acrylate compound or a (meth)acrylate compound having a (thio)urethane bond, it becomes difficult to control the refractive index. When the amount of ultrafine inorganic particles is high(or large) in the composition, on the contrary, a coating layer becomes weakened and adhesion becomes insufficient.

Furthermore, when (d) one or more hydroxyl group-containing (meth)acrylate compounds represented by the formulae (7) to (10) and (e) β-diketone compound are further added to a composition comprising (a) a thio(meth) acrylate compound and (b) ultrafine inorganic particles, as they can be used without substantially adding a solvent, effect to the human body or environment becomes smaller and a relatively thick molded product can be obtained at the same time.

Ultrafine inorganic particles generally tend to be dispersion-stabilized in a hydrophilic organic solvent, while the same tendency is detected when ultrafine inorganic particles are dispersed in a hydrophilic (meth)acrylate containing a hydroxyl group. Furthermore, by adding a β-diketone compound, a thio(meth)acrylate compound and ultrafine inorganic particles show a tendency to be dispersion-stabilized.

As a (d) a hydroxyl group-containing (meth)acrylate compound, there can be mentioned compounds represented by the formulae (7) to (10). Specifically, the following compounds can be mentioned; 2-hydroxy ethyl (meth)acrylate (=HE (M) A), 3-hydroxy propyl (meth)acrylate, 4-hydroxy butyl (meth)acrylate, 2-hydroxy propyl (meth)acrylate, 2-hydroxy butyl (meth)acrylate, 2-hydroxy-3-(meth) acryloyloxy (meth)acrylate, pentaerythritol tri(meth) acrylate. These compounds may be used singly or in combination of two or more kinds.

The desirable ratio for (a) a thio(meth)acrylate compound, (b) ultrafine inorganic particles and (d) a hydroxyl group-containing (meth)acrylate compound is in the following range in view of the stability of a composition.

(iii) (a):(d) is 1 weight %: 99 weight % to 99 weight %: 1 weight %, preferably 5 weight %: 95 weight % to 95 weight %: 5 weight %, and more preferably 10 weight %: 90 weight % to 90 weight %: 10 weight %.

When the amount of a thio(meth)acrylate compound is small, high refractive index can not be expected. When the amount of a hydroxyl group-containing (meth)acrylate compound is extremely small, good dispersibility cannot be obtained.

(iv) (b)/((a)+(b)+(d)) is more than 1 weight % and less than 90 weight %, preferably more than 5 weight % and less than 80 weight %, and more preferably more than 10 weight % and less than 70 weight %.

When the amount of ultrafine inorganic particles is small in the composition, it becomes difficult to control the refractive index. When the amount of ultrafine inorganic particles is high(or large) in the composition, gelation and whiting of the composition, and cohesion and precipitation of ultrafine inorganic particles might easily occur because no solvent is actually added.

As (e) a β-diketone compound, there can be mentioned, specifically, those represented by (11), and more specifically, 2,4-pentanedion (acetyl acetone), 3-methyl-2,4-pentanedion, 3-isopropyl-2,4-pentaned ion, 2,2-dimethyl-3,5-hexanedion, 1,3-diphenyl-1,3-propanedion, 1,3-cyclopentadion, acetoacetic acid, dimethyl maronate, meton and the like.

The amount of β-diketone compound used is 0.1 to 100 weight parts to 100 weight parts of ultrafine inorganic particles, preferably 1 to 50 weight parts, and more preferably 5 to 30 weight parts. When the amount added is small, good dispersion can not be obtained. When the amount is high(or large), there is a possibility that curability of a thio(meth)acrylate might be influenced.

Incidentally, it is more preferable to improve the general physical properties as described above (adherence to a resin, surface hardness, scratch resistivity, dispersion stability or the like) by adding (c) to (e) components to (a) and (b) components completely.

Furthermore, in order to adjust the physical properties of a cured product, an acrylic oligomer/monomer other than a thioacrylate having 2 or more (meth)acryloyloxy groups in a molecule may be combined in any composition.

Specifically, there can be mentioned, for example, triethylene glycol di(meth)acrylate, polyethylene glycol di(meth) acrylate, neo benzyl glycol di(meth)acrylate, 1,6-hexanediol di(meth)acrylate, 1,9-nonanediol di(meth)acrylate, dimethylol tricyclodecane di(meth)acrylate, trimethylol propane tri (meth)acrylate, ethylene oxide-modified trimethylolpropane tri(meth)acrylate, pentaerythritol tri(meth)acrylate, pentaerythritol tetra(meth)acrylate, dipentaerythritol hexa(meth)acrylate, bisphenol A diglycidyl ether (meth)acrylic acid adduct, 1,1,3,3,5,5-hexa((meth)acryloxy) cyclotriphosphozene, 1,1,3,3,5,5-hexa(meth)acryloxy ethyloxy) cyclotriphosphozene and the like.

Also, a (meth)acrylic monomer having a (meth)acryloyloxy group in a molecule may be combined for the purpose of adjustment of the viscosity and the like. Specifically, there can be mentioned isoamyl (meth)acrylate, lauryl (meth) acrylate, stearyl (meth)acrylate, butoxyethyl (meth)acrylate, ethoxy diethylene glycol (meth)acrylate, methoxy triethylene glycol (meth)acrylate, methoxy polyethylene glycol (meth)acrylate, methoxy dipropylene glycol (meth)acrylate, methoxy diethylene glycol (meth)acrylate phenoxyethyl (meth)acrylate, phenoxy polyethylene glycol (meth)acrylate, tetra hydrofurfuryl (meth)acrylate, isobornyl (meth)acrylate, 2-hydroxyethyl (meth)acrylate, 2-hydroxypropyl (meth)acrylate, 2-hydroxy-3-phenoxypropyl (meth)acrylate, (meth)acrylic acid, (meth)acrylic acid glycidyl, 2-(meth)acryloyloxyethyl-succinic acid, 2-(meth)acryloyloxyethyl phthalic acid, isooctyl (meth)acrylate, isomyristyl (meth)acrylate, 2-hydroxybutyl (meth)acrylate, methyl (meth)acrylate, ethyl (meth)acrylate, n-butyl (meth)acrylate, isobutyl (meth)acrylate, cyclohexyl methacrylate, benzyl (meth)acrylate, (meth)acryloyl morpholine and the like.

Also, a reactive monomer having a plurality of vinyl groups or thiol groups may be added for the purpose of producing the viscosity or controlling curability as well.

Specifically, there can be mentioned, for example, N-vinyl pyrrolidone, N-vinyl carbazol, vinyl acetate, trimethylolpropane bis(2-mercaptoacetate), trimethylol propane bis(3-mercapto propionate), pentaerythritol tetrakis(2-mercaptoacetate), pentaerythritol (3-mercapto propionate) and the like.

Also, in order to promote curing with ultraviolet rays or heat, a photo or thermal polymerization initiator may be combined.

As photopolymerization initiators, commercial ones can be used in general. Particularly, there can be mentioned, for example, benzophenon, 2,2-dimethoxy-1,2-diphenylethane-1-on (a product of Ciba Specialty Chemicals Inc.; Irgacure-651), 1-hydroxy-cyclohexyl-phenyl-ketone (a product of Ciba Specialty Chemicals Inc.; Irgacure-184), 2-hydroxy-2-methyl-1-phenyl-propane-1-on (a product of Ciba Specialty Chemicals Inc.; Darocure-1173, a product of Lamberti s.p.a.; Esacure-KL200), oligo(2-hydroxy-2-methyl-1-phenyl-propane-1-on) (a product of Lamberti s.p.a., Esacure-KIP150), (2-hydroxyethyl)-phenyl)-2-hydroxy-2-methyl-1-propane-1-on) (a product of Ciba Specialty Chemicals Inc.; Irgacure-2959), 2-methyl-1(4-(methylthio)phenyl)-2-molphorino propane-1-on (a product of Ciba Specialty Chemicals Inc.; Irgacure-907), 2-benzyl-2-dimethylamino-1-(4-molphorino phenyl)-butanone-1 (a product of Ciba Specialty Chemicals Inc.; Irgacure-369), bis(2,4,6-trimethylbenzoyl) phenylphosphine oxide (a product of Ciba Specialty Chemicals Inc.; Irgacure-819), bis(2,6-dimethoxybenzoyl)-2,4,4-trimethyl-pentylphosphine oxide (a product of Ciba Specialty Chemicals Inc.; CGI403), 2,4,6-trimethylbenzoyl-diphenyl-phosphine oxide (TMDPO, a product of BASF Corp., Lucirin TPO; a product of Ciba Specialty Chemicals Inc., Darocure-TPO), thioxanthone or derivatives thereof and the like. One or two or more kinds thereof may be used in combination.

Furthermore, tertiary amines, for example, triethanolamine, ethyl-4-dimethylaminobenzoate, isopentyl methylaminobenzoate and the like may be added according to the purpose of photosensitized action.

As a thermal polymerization initiator, peroxides such as benzoyl peroxide (BPO) and the like; azo compounds such as azobisisobutyronitrile (AIBN) and the like are mainly used. The amount of an initiator to be combined is usually around 0.1 to 10 weight parts to 100 weight parts of a composition ((meth)acrylate and ultrafine inorganic particles).

When the amount of a photo (thermal) polymerization initiator to be generally added is small, good curability can not be obtained. When the amount is excessively high(or large), performance proportionate to the amount can not be obtained, on the contrary, the resolved product might have a bad effect such as muddiness upon the physical properties of a cured product.

When a solvent is added, as a solvent, there can be mentioned, for example, water or polar organic solvents, i.e., lower alcohols such as methyl alcohol, ethyl alcohol, isopropyl alcohol and the like; dimethyl formamide, N,N'-dimethyl acetamide, N-methyl-2-pyrrolidone, methylcellosolve, ethylcellosolve, butylcellosolve, ethylene glycol, tetrahydrofuran, dioxane, toluene of a low polar solvent and the like. The viscosity of a coating solution can be adjusted by a coating method on a base material, but preferably 0.1 to 10000 cp, more preferably 0.5 to 500 cp, and further preferably 1 to 100 cp.

In a composition for coating, various additives such as ultraviolet ray absorbent, anti-oxidant, silicon-series surfactant and the like can be combined according to purposes.

As methods to evaluate adherence of hard coatings and to evaluate its surface hardness, there can be mentioned a cross-hatch, tape-peeling test (JIS-K5400) and pencil scratch test value (JIS-K5400) respectively. For a curing layer of 2 µm thickness coated on the surface of a resin plate and cured with ultraviolet rays, (1) evaluation score of a cross-hatch, tape-peeling test (JIS-K5400) takes preferably more than 6 and more preferably more than 8; and (2) pencil scratch test value (JIS-K5400) is preferably more than 3H and more preferably more than 4H.

Also, storage stability (pot life) of a composition is preferably one month or more for storage at room temperature and 6 months or more for storage in a refrigerator (4° C.), and more preferably 6 months or more for storage at room temperature and a year or more for storage in a refrigerator (4° C.).

[Coat Method, Curing Method and Molding Method]

When the composition is coated on a base material, methods such as dip, spin coat, spray and the like can be adopted.

As a light source necessary for photopolymerization, a variety of low pressure, high pressure, ultra high pressure mercury lamps, chemical lamps, metal halide lamps and the like can be used. The time to conduct photopolymerization is preferably 1 second to 10 minutes. If it takes less than 1 second, sufficient photocuring cannot be conducted. If it takes more than 10 minutes, a coating layer and a base material are deteriorated so coloring, deflection or the like might occur in some cases. In curing process, the composition is coated on a base material and then a solvent in the composition is dried as needed. Drying temperature and time are determined by the boiling point of a solvent used.

The temperature condition necessary for thermal polymerization is generally 50° C. or more, preferably 80° C. or more. However, it is determined by the boiling point of a solvent to be used, thermostabe(or heat-resistant) temperature of a base material and the kind of a thermal polymerization initiator.

When the volatile component of a substantial solvent or the like is not contained, the composition is introduced to a mold comprising a glass mold and a gasket for photocuring to obtain a thick plate having several mms or more.

[Usage of a Composition of the Present Invention]

The composition of the present invention can be widely used as the refractive index can be controlled, and scratch resistivity and adherence are excellent and transparency is extremely high if the composition is coated on a base material such as a resin or the like and then cured. Namely, by coating the composition, the composition can be used as spectacles, camera lenses, pickup lenses of devices for optical recording and reproduction, and hard coatings of film lenses. In addition to that, it can be used for anti-reflection layer for liquid crystal display, EL display and CRT display; anti-reflection layer of a color filter for color separation used for liquid crystal devices; surface protective film for printed matters used to reduce light reflection from the surface of the printed matter by protecting the surface of so-called printed matters guiding plate; sign board; poster and the like, and it is further used for anti-reflection layers of materials for windows and doors, light cover or helmet shield.

Furthermore, it can be used as surface protective materials for optical recording media, high refractive index film for reading and writing of high density recording optical media; surface ornamentation materials such as resin materials, metal materials, ceramic materials, glass materials, artificial marble and the like aesthetically; adhesives for junction of optical materials such as lenses, waveguide and the like as well.

Also, by using a mold or the like, it can be molded as spectacle lenses, pickup lenses, prism sheet, micro-lens arrays.

EXAMPLES

The present invention is described specifically below by way of Production Examples and Examples. However, the present invention is not restricted to these Production Examples and Examples.

1. Production of Ultrafine Inorganic Particle Dispersion

Production Example 1

[Synthesis of Ultrafine Titanium Oxide Particles and Production of Dispersion]

7.5 ml (corresponding to Ti: 0.036 mol) of titanium oxychloride·HCL aqueous solution (Fluka reagent Hydrochloric acid: 38 to 42%, Ti: approximately 15%) was dissolved in 1000 ml of ion exchange water and stirred at a temperature of 70° C. to obtain an aqueous solution of bluish titanium oxide colloid after 5 hours.

PH of colloid aqueous solution was adjusted near 5 by ion dialysis, and then a solvent was converted into methylcellosolve according to the concentration method. 1.0 g of acrylic acid as a dispersing agent was further added thereto and the resulting solution was sufficiently stirred to obtain a methylcellosolve dispersion of titanium oxide of 20% solid content weight. The thus-obtained sol solution was partially dropped to mesh and an electronic microscope reagent was prepared. As a result of observation, a titanium oxide crystal having an average particle diameter of 5 nm was confirmed.

Production Example 2

[Synthesis of Ultrafine Zirconium Oxide Particles and Production of Dispersion]

10.5 g of zirconium oxychloride octahydrated salt (a product of Wako Pure Chemical Industries, Ltd., corresponding to Zr: 0.036 mol) was dissolved in 1000 ml of ion exchange water and then stirred at a temperature of 100° C. to obtain an aqueous solution of bluish zirconium oxide colloid solution after 20 hours. PH of colloid aqueous solution was adjusted near 4 by ion dialysis, and then a solvent was converted into methylcellosolve according to the concentration method. 1.0 g of acrylic acid as a dispersing agent was further added thereto and the resulting solution was sufficiently stirred to obtain a methylcellosolve dispersion of zirconium oxide of 20% solid content weight. An average particle diameter was 10 nm.

Production Example 3

[Synthesis of Ultrafine Zirconium Oxide-coated Titanium Oxide Particles and Production of Dispersion]

A bluish titanium oxide colloid solution was obtained according to the method in Production Example 1.

6.4 g (corresponding to Zr: 0.020 mol) of zirconium oxychloride octahydrate was added to the colloid solution and the reaction solution was prepared at a temperature of 100° C. and stirred for 5 hours. As a result, a blue-white sol solution in a slurry form was obtained. PH of the colloid aqueous solution was adjusted near 5 by ion dialysis, and then a solvent was converted into methylcellosolve according to the concentration method. 1.0 g of acrylic acid as a dispersing agent was further added thereto and the resulting solution was sufficiently stirred to obtain a methylcellosolve dispersion of ultrafine zirconium oxide-coated titanium oxide particles of 20% solid content weight.

Production Example 4

[Synthesis of Ultrafine Zinc Oxide Particles and Production of Dispersion]

2.6 g (0.066 mol) of sodium hydroxide was dissolved in 720 ml of ethanol. 4.8 g (corresponding to Zn: 0.016 mol) of zinc nitrate hexahydrate was further added thereto and the reaction solution was prepared at a temperature of 70° C. and stirred for 2 hours. The reaction mixture generated white precipitation for about 2 hours, recovered precipitation by centrifugation and was washed with methanol five times. Methylcellosolve was added thereto, and then 1.0 g of polyvinyl pyrrolidone as a dispersing agent was added; the resulting solution was sufficiently stirred to obtain a dispersion of 20% solid content weight. An average particle diameter was 5 nm.

Production Example 5

[Synthesis of Ultrafine Zinc Sulfide Particles and Production of Dispersion]

3.7 g (0.010 mol) of zinc perchloric acid hexahydrate was dissolved in 30 ml of methanol. 2.9 g (0.020 mol) of octanethiol was added thereto and the reaction solution was stirred at room temperature. Thereto, mixed gas in which concentration of hydrogen sulfide to helium (hydrogen sulfide/helium) was adjusted to be 5 volume % was introduced for 20 minutes under stirring. Furthermore, it took another 20 minutes for stirring without introducing the gas. This procedure was repeated twice and nitrogen gas was introduced for 10 minutes and stirred at the same time. As a result, a blue-white colloid solution was obtained. When ammonium gas was introduced and stirred, white precipitation was obtained. After precipitation was recovered by centrifugation, the precipitation was washed with methanol 5 times, and then tetrahydrofuran was added thereto, and the resulting solution was sufficiently stirred to obtain a dispersion of 20% solid content weight.

Production Example 6

[Production of Ultrafine Tin Oxide Particle Dispersion]

Water in 20.0 g of 10 weight % aqueous solution of tin oxide, a product of Taki Chemical Co., Ltd. (product name: Cerames C-10, a tin oxide particle diameter of 2 nm) was converted into methylcellosolve according to the concentration method. Furthermore, in order to be dispersion-stabilized, 1.0 g of an acrylic acid was added thereto, and the resulting solution was sufficiently stirred to obtain a methylcellosolve dispersion of 10% solid content weight.

Production Example 7

[Production of Ultrafine Antimonous Oxide Particle Dispersion]

Methanol in methanol dispersion (product name: AMT-130S, a antimonous oxide particle diameter of 10 to 20 nm) of antimonous oxide, a product of Nissan Chemicals, Ltd., was converted into methylcellosolve according to the concentration method. Furthermore, in order to be dispersion-stabilized, 1.0 g of an acrylic acid was added thereto, and the resulting solution was sufficiently stirred to obtain a methylcellosolve dispersion of 20% solid content weight.

Production Example 8

[Production of Ultrafine Aluminium Oxide Particle Dispersion]

Water in 10.0 g of 20 weight % water dispersion (product name: Aluminasol-520, a aluminium oxide particle diameter of 10 nm×20 nm) of aluminium oxide, a product of Nissan Chemicals, Ltd., was converted into methylcellosolve according to the concentration method. Furthermore, in order to be dispersion-stabilized, 1.0 g of an acrylic acid was added thereto, and the resulting solution was sufficiently stirred to obtain a methylcellosolve dispersion of 20% solid content weight.

Production Example 9

[Production of Ultrafine Silicon Dioxide (Silica) Particle Dispersion]

30 weight % MIBK dispersion (product name: Colloidal Silica Snowtex MIBK-ST, a particle diameter of 10 to 20 nm) of ultrafine silicon dioxide particles, a product of Nissan Chemicals, Ltd., were diluted with MIBK dispersion of 20% solid content weight to prepare a dispersion.

2. Production and Evaluation of a Composition of the Present Invention

Example 1

10.0 g (solid content 2.0 g) (769 weight parts as dispersion) of 20% methylcellosolve dispersion of titanium oxide obtained in Production Example 1, 1.04 g (80 weight parts) of bis-2-acryloylthioethyl sulfide and 0.26 g (20 weight parts) of pentaerythritol triacrylate hexamethylene diisocyanate urethane pre-polymer (Kyoeisha Chemical Co., Ltd., a product name: UA-306H) were mixed, and then 3.0 g (230 weight parts) of ethylcellosolve was added thereto. Furthermore, 0.17 g (13 weight parts) of 2,4,6-trimethylbenzoyl-diphenyl-phophine oxide (TMDPO) as a photo-initiator and Si-series surfactant (Nippon Unicar Co., Ltd., product name: FZ-2110) was added thereto, and the resulting solution was sufficiently stirred to produce a composition for coating. Then, evaluation was conducted in a method as described later (100 weight parts of acrylate component and 154 weight parts of ultrafine particle component).

Examples 2 to 15

Each composition in Examples 2 to 15 was produced in the same manner as in Example 1, except that compositions shown in Table 1 ware used instead. Then, evaluation was conducted in a method as described later.

Incidentally, the formulae (17) to (22) were used for a thio(meth)acrylate.

(17)
< thioacrylate-1 : bis-2-acryloylthioethyl sulfide >

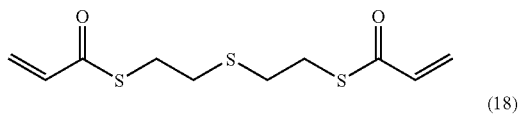

(18)
< thioacrylate-2 : 1,4-bisacryloylthio benzene >

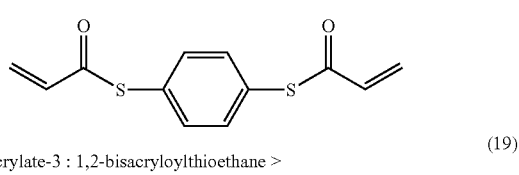

(19)
< thioacrylate-3 : 1,2-bisacryloylthioethane >

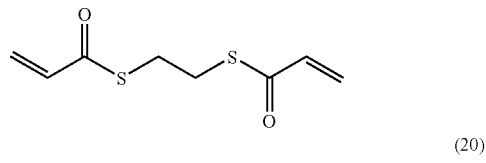

(20)
< thioacrylate-4 : 1,2-bis(2-acryloylthioethylthio)-3-acryloylthiopropane >

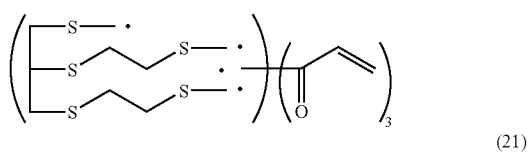

(21)
< thioacrylate-5 : bis-(2-acryloylthioethylthio)-3-acryloylthiopropyl) sulfide >

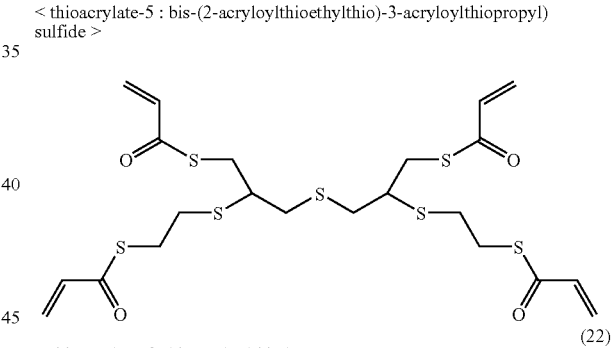

(22)
< thioacrylate-6 : bisacryloylthio benzene >

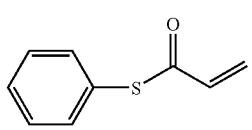

Comparative Example 1

2.6 g (80 weight parts) of bis-2-acryloylthioethyl sulfide, 0.65 g (20 weight parts) of pentaerythritol triacrylate hexamethylene diisocyanate urethane pre-polymer (Kyoeisha Chemical Co., Ltd., a product name: UA-306H) were mixed, and then 10.0 g (308 weight parts) of ethylcellosolve was added thereto. Furthermore, 0.17 g (5.2 weight parts) of 2,4,6-trimethyl benzoyl-diphenyl-phosphine oxide (TMDPO) as a photo-initiator and Si-series surfactant (a product of Nippon Unicar Co., Ltd., product name: FZ-2110) were added thereto, and the resulting solution was sufficiently stirred to produce a composition for coating. Then, evaluation was conducted in a method as described later.

Comparative Examples 2 to 7

Each composition in Comparative Examples 2 to 7 was produced in the same manner as in Comparative Example 1, except that compositions shown in Table 1 ware used instead. Then, evaluation was conducted in a method as described later.

Evaluation of a composition for coating having high refractive index was conducted as follows.

Each coating solution produced in Examples 1 to 15 and Comparative Examples 1 to 7 was coated on a quartz board, polycarbonate (PC) board, polymethyl methacrylate (PMMA) board having a thickness of 2 mm respectively by spin coat, dried at room temperature for an hour and then thereon was irradiated a metal halide lamp (intensity: 120W/cm) for 60 seconds, thus forming a hard coat film having a thickness of 0.5 to 2 μm.

Furthermore, a coating solution in Example 10 was spin-coated in the same manner and dried at room temperature for an hour, heat-treated at 50° C. for 10 minutes in a hot air drier and then further heat-treated at 100° C. for 30 minutes. Incidentally, the results were indicated in Table 1.

(1) Refractive Index:

A coating layer formed on the quartz board was measured by ellipsometry (a product of JASCO Inc., M-150). Also, the difference of the refractive index between a product in which ultrafine inorganic particles were combined and a product in which ultrafine inorganic particles were not combined was represented by Δ n.

(2) Scratch Resistivity:

A coating layer and PMMA board (a product of Mitsubishi Rayon) as a comparison were scrubbed with an iron wool numbered 0000 to determine the degree of scratch of the coating film as compared to the PMMA board and evaluated in the following three steps.
  ○ . . . Scratched less than PMMA
  Δ . . . Scratched equal to PMMA
  x . . . Scratched greater than PMMA The results were ○ (Scratched less than PMMA) in all of the cases.

(3) Light Resistance Test:

A sample coated on the quartz board was irradiated using a solar simulator for 200 hours.
  ○ . . . No yellowing
  Δ . . . Yellowing
  x . . . Film weakened The results were a little Δ (Yellowing) in Example 1 and ○ (No yellowing) in the rest of the cases.

(4) Adherence Test:

The cross-hatch, tape-peeling test (JIS-K5400) was conducted. On the surface of a coating layer-attached base material (PC and PMMA) was calibrated and made cut in with a cutter knife at an interval of 2 mm to form 25 scale cells of 4 mm$^2$ using a cutter guide (JIS K5400 Rule). Thereon was strongly attached a cellophane adhesive tape (JIS Z1522 Rule) and which was then rapidly pulled for counting scale cells remained on the coat film(or coating layer).

Evaluation Score
  10: No peel-off
  8: Peel-off in a defect part: within 5% of the total
  6: Peel-off in a defect part: within 5% to 15% of the total
  4: Peel-off in a defect part: within 15% to 35% of the total
  2: Peel-off in a defect part: within 35% to 65% of the total
  0: Peel-off in a defect part: more than 65% of the total The results were 10 (No peel-off) for a base material (PC and PMMA).

(5) Appearance, Transparency:

No crack was visually confirmed for a sample coated on a quartz board in which no crack was confirmed and the transparency between 400 nm and 600 nm was measured by the uv-vis spectrophotometer (Shimadzu UV2200).
  ○ . . . Over 90% transparency between 400 nm and 600 nm
  Δ . . . 80 to 90% transparency between 400 nm and 600 nm
  x . . . Less than 80% transparency between 400 nm and 600 nm (6) Storage Stability (Pot Life) of a Hard Coating Composition Each of products in Examples 1 to 15 and Comparative Examples 1 to 7 was put into a brown sample bottle for sealing completely, and then kept still standing at a darkroom for a month at room temperature or for 6 months at 4° C. to investigate its change.
  ○ . . . No gelation of a solution and no change in the viscosity
  Δ . . . No gelation of a solution, but change in the viscosity
  x . . . Gelation of a solution The results were ○ (No gelation of a solution and no change in the viscosity) both at room temperature and at 4° C.

TABLE 1

| | | | Remarks | Example 1 | Example 2 | Example 3 | Example 4 | Example 5 | Example 6 | Example 7 |
|---|---|---|---|---|---|---|---|---|---|---|
| Composition | (a) Component thioacrylate | thioacrylate-1 | *1) | 80 | | 80 | 80 | 80 | 80 | |
| | | thioacrylate-2 | *2) | | 80 | | | | | |
| | | thioacrylate-3 | *3) | | | | | | | 80 |
| | | thioacrylate-4 | *4) | | | | | | | |
| | | thioacrylate-5 | *5) | | | | | | | |
| | | thioacrylate-6 | *6) | | | | | | | |
| | (b) Component Dispersion (Solid content) | TiO2 (solid content 20%) | Production Example 1 | 769 (154) | | | | | | |
| | | ZrO2 (solid content 20%) | Production Example 2 | | 769 (154) | | | | | |
| | | ZrO2—TiO2 (solid content 20%) | Production Example 3 | | | 769 (154) | | | | 769 (154) |
| | | ZnO (solid content 20%) | Production Example 4 | | | | 769 (154) | | | |

TABLE 1-continued

|  |  |  |  |  |  |  |  |  |  |  |
|---|---|---|---|---|---|---|---|---|---|---|
|  |  | ZnS (solid content 20%) | Production Example 5 |  |  |  |  |  |  |  |
|  |  | SnO2 (solid content 10%) | Production Example 6 |  |  |  |  | 1538 (154) |  |  |
|  |  | Sb2O5 (solid content 20%) | Production Example 7 |  |  |  |  |  | 769 (154) |  |
|  |  | Al2O3 (solid content 20%) | Production Example 8 |  |  |  |  |  |  |  |
|  |  | SiO2 (solid content 20%) | Production Example 9 |  |  |  |  |  |  |  |
|  | Acrylate | UT-1 | *6) | 20 | 20 | 20 | 20 | 20 | 20 | 20 |
|  |  | HEA | *7) |  |  |  |  |  |  |  |
|  |  | DPEHA | *8) |  |  |  |  |  |  |  |
|  | Initiator | TMDPO |  | 13 | 13 | 13 | 13 | 13 | 13 | 13 |
|  |  | Darocure-1173 |  |  |  |  |  |  |  |  |
|  |  | Benzoyl Peroxide (BPO) |  |  |  |  |  |  |  |  |
|  | Solvent | Ethylcellosolve |  | 230 | 230 | 230 | 230 |  | 230 | 230 |
|  |  | THF |  |  |  |  |  |  |  |  |
|  |  | MIBK |  |  |  |  |  |  |  |  |
| (b) Ratio |  | b/(b + acrylate component) (%) | b: solid content | 60.6 | 60.6 | 60.6 | 60.6 | 60.6 | 60.6 | 60.6 |
| Total Evaluation Results |  | Weight parts |  | 1112 | 1112 | 1112 | 1112 | 1651 | 1112 | 1112 |
|  |  | (1) Refractive index |  | 1.78 | 1.72 | 1.72 | 1.71 | 1.71 | 1.70 | 1.72 |
|  |  | Δn(Difference in particles) |  | +0.19 | +0.11 | +0.13 | +0.12 | +0.12 | +0.11 | +0.15 |
|  |  | (5) Transparency |  | ○ | ○ | ○ | ○ | ○ | ○ | ○ |

|  |  |  | Example 8 | Example 9 | Example 10 | Example 11 | Example 12 | Example 13 | Example 14 | Example 15 |
|---|---|---|---|---|---|---|---|---|---|---|
| Composition | (a) Component thioacrylate | thioacrylate-1 |  |  | 80 | 80 | 80 | 80 | 80 | 40 |
|  |  | thioacrylate-2 |  |  |  |  |  |  |  |  |
|  |  | thioacrylate-3 |  |  |  |  |  |  |  |  |
|  |  | thioacrylate-4 | 80 |  |  |  |  |  |  |  |
|  |  | thioacrylate-5 |  | 80 |  |  |  |  |  |  |
|  |  | thioacrylate-6 |  |  |  |  |  |  |  | 40 |
|  | (b) Component Dispersion (Solid content) | TiO2 (solid content 20%) |  |  |  |  |  |  |  |  |
|  |  | ZrO2 (solid content 20%) |  |  |  |  |  |  |  |  |
|  |  | ZrO2—TiO2 (solid content 20%) |  |  | 769 (154) |  | 769 (154) | 769 (154) | 769 (154) |  |
|  |  | ZnO (solid content 20%) |  |  |  |  |  |  |  |  |
|  |  | ZnS (solid content 20%) | 769 (154) | 769 (154) |  |  |  |  |  |  |
|  |  | SnO2 (solid content 10%) |  |  |  |  |  |  |  |  |
|  |  | Sb2O5 (solid content 20%) |  |  |  |  |  |  |  |  |
|  |  | Al2O3 (solid content 20%) |  |  |  | 769 (154) |  |  |  |  |
|  |  | SiO2 (solid content 20%) |  |  |  |  |  | 769 (154) |  |  |
|  | Acrylate | UT-1 |  |  | 20 | 20 | 20 | 20 | 20 |  |
|  |  | HEA |  |  |  |  |  |  | 20 | 10 |
|  |  | DPEHA |  |  |  |  |  |  |  | 10 |
|  | Initiator | TMDPO | 13 | 13 |  | 13 | 13 | 6.5 | 13 | 13 |
|  |  | Darocure-1173 |  |  |  |  |  | 6.5 |  |  |
|  |  | Benzoyl Peroxide (BPO) |  |  |  |  | 13 |  |  |  |
|  | Solvent | Ethylcellosolve |  |  |  | 230 | 230 |  |  |  |
|  |  | THF | 230 | 230 |  |  |  |  |  |  |
|  |  | MIBK |  |  |  |  |  | 230 |  |  |
| (b) Ratio |  | b/(b + acrylate component) (%) | 60.6 | 60.6 | 60.6 | 60.6 | 60.6 | 60.6 | 60.6 | 0 |
| Total Evaluation Results |  | Weight parts | 1112 | 1112 | 1112 | 1112 | 1112 | 882 | 882 | 882 |
|  |  | (1) Refractive index | 1.71 | 1.71 | 1.72 | 1.61 | 1.58 | 1.72 | 1.72 | 1.72 |
|  |  | Δn(Difference in particles) | +0.11 | +0.11 | +0.13 | +0.02 | −0.02 | +0.15 | +0.15 | — |
|  |  | (5) Transparency | ○ | ○ | ○ | Δ | ○ | ○ | ○ | ○ |

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Composition | (a) Component thioacrylate | thioacrylate-1 | 80 |  |  |  |  | 80 | 40 |
|  |  | thioacrylate-2 |  | 80 |  |  |  |  |  |
|  |  | thioacrylate-3 |  |  | 80 |  |  |  |  |

TABLE 1-continued

| | | 1 | 2 | 3 | 4 | 5 | 6 | 7 |
|---|---|---|---|---|---|---|---|---|
| | thioacrylate-4 | | | | | 80 | | |
| | thioacrylate-5 | | | | | | 80 | |
| | thioacrylate-6 | | | | | | | 40 |
| (b) Component Dispersion (Solid content) | TiO2 (solid content 20%) | | | | | | | |
| | ZrO2 (solid content 20%) | | | | | | | |
| | ZrO2—TiO2 (solid content 20%) | | | | | | | |
| | ZnO (solid content 20%) | | | | | | | |
| | ZnS (solid content 20%) | | | | | | | |
| | SnO2 (solid content 10%) | | | | | | | |
| | Sb2O5 (solid content 20%) | | | | | | | |
| | Al2O3 (solid content 20%) | | | | | | | |
| | SiO2 (solid content 20%) | | | | | | | |
| Acrylate | UT-1 | 20 | 20 | 20 | 20 | 20 | | |
| | HEA | | | | | | 20 | 10 |
| | DPEHA | | | | | | | 10 |
| Initiator | TMDPO | 5.2 | 5.2 | 5.2 | 5.2 | 5.2 | 5.2 | 5.2 |
| | Darocure-1173 | | | | | | | |
| | Benzoyl Peroxide (BPO) | | | | | | | |
| Solvent | Ethylcellosolve | 308 | 308 | 308 | 308 | 308 | | |
| | THF | | | | | | | |
| | MIBK | | | | | | | |
| (b) Ratio | b/(b + acrylate component) (%) | 0 | 0 | 0 | 0 | 0 | 0 | 0 |
| Total | Weight parts | 413.5 | 413.2 | 413.2 | 413.2 | 413.2 | 105.2 | 105.2 |
| Evaluation Results | (1) Refractive index | 1.59 | 1.61 | 1.57 | 1.60 | 1.6 | 1.59 | 1.59 |
| | Δn(Difference in particles) | — | — | — | — | — | — | — |
| | (5) Transparency | ○ | ○ | ○ | ○ | ○ | ○ | ○ |

*1) bis-2-acryloylthioethyl sulfide
*2) 1,4-bisacryloylthio benzene
*3) 1,2-bisacryloylthio ethane
*4) 1,2-bis(2-acryloylthioethylthio)-3-acryloyithio propane
*5) bis-(2-acryloylthioethylthio-3-acryloylthio propyl) sulfide
*6) UT-1: pentaerythritol triacrylate-hexamethylene diisocyanate urethane pre-polymer (a product of Kyoeisha Chemical Co., Ltd.)
*7) HEA: 2-hydroxyethyl acrylate
*8) DPEHA: dipentaerythritol hexaacrylate 3. Production and Evaluation of hard Coating compositions containing a Composition of the Present Invention Production Example 10

[Production of a Resin Having a Thio Urethane Bond (1)]

36.4 g of m-xylilene diisocyanate represented by the formula (23), 33.6 g of 1,2-bis(2-mercaptoethyl)thio-3-mercapto propane represented by the formula (24), 0.01 g of dibutyltin dichloride, and 0.07 g of Zelec UN (STEPAN Co.) as an internal mold release agent were added and stirred for degassing under reduced pressure for an hour. The resulting mixture was filtered using 1 μm Teflon (registered trademark) filter and then was introduced to a mold comprising a glass mold and a gasket. Temperature of the mold was slowly increased from 40° C. to 120° C., while polymerizing the mixture for 20 hours. When polymerization was finished, the mold was slowly cooled and a resin was taken out of the mold. The thus-obtained resin was anneal-treated at 120° C. for 3 hours to obtain a resin plate (thickness of 5 mm).

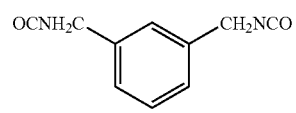
(23)

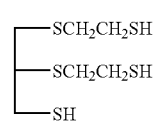
(24)

Production Example 11

[Production of a Resin Having a Thio Urethane Bond (2)]

37.6 g of m-xylilene diisocyanate, 33.6 g of isomer mixture represented by the formulae (25) to (27), 0.01 g of dibutyltin dichloride, and 0.07 g of Zelec UN (STEPAN Co.) as an internal mold release agent were added and stirred for degassing under reduced pressure for an hour. The resulting mixture was filtered using 1 μm Teflon (registered trademark) filter and then was introduced to a mold comprising a glass mold and a gasket. Temperature of the mold was slowly increased from 40° C. to 120° C., while polymerizing the mixture for 20 hours. When polymerization was finished, the mold was slowly cooled and a resin was taken out of the mold. The thus-obtained resin was anneal-treated at 120° C. for 3 hours to obtain a resin plate (thickness of 5 mm).

(25)/(26)/(27)=80/10/10 (mol ratio)

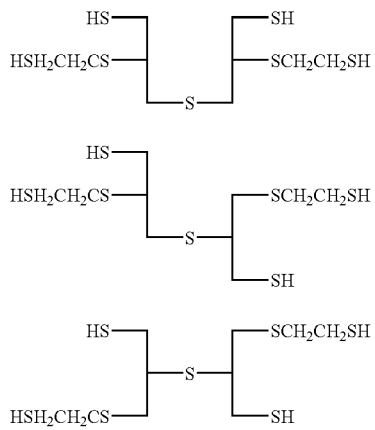

Production Example 12

[Production of a Resin having a Thio Urethane bond (3)]

37.6 g of m-xylilene diisocyanate, 27.6 g of bis-2-mercaptoethyl ether represented by the formula (28), 0.01 g of dibutyltin dichloride, and 0.07 g of Zelec UN (STEPAN Co.) as an internal mold release agent were added and stirred for degassing under reduced pressure for an hour. The resulting mixture was filtered using 1 am Teflon (registered trademark) filter and then was introduced to a mold comprising a glass mold and a gasket. Temperature of the mold was slowly increased from 40° C. to 120° C., while polymerizing the mixture for 20 hours. When polymerization was finished, the mold was slowly cooled and a resin was taken out of the mold. The thus-obtained resin was anneal-treated at 120° C. for 3 hours to obtain a resin plate (thickness of 5 mm).

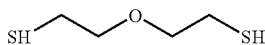

Production Example 13

[Production of a Resin having an Epithiosulfide bond (1)]

To 70.0 g of bis(2,3-epithiopropyl) disulfide represented by the formula (29), 0.014 g of N,N-dimethyl cyclohexylamine and 0.07 g of N,N-dicyclohexylmethylamine were added and stirred for degassing under reduced pressure for an hour. The resulting mixture was filtered using 3 μm Teflon (registered trademark) filter and then was introduced to a mold comprising a glass mold and a gasket over 4 hours. This mold was kept warm at 30° C. for 10 hours and then temperature of the mold was increased from 30° C. to 80° C., while polymerizing the mixture for 20 hours. When polymerization was finished, the mold was slowly cooled and a resin was taken out of the mold. The thus-obtained resin was anneal-treated at 120° C. for 3 hours to obtain a resin plate (thickness of 5 mm).

Production Example 14

[Production of a Resin having an Epithiosulfide bond (2)]

To 70.0 g of bis(β-epithiopropyl) sulfide represented by the formula (30), 0.35 g of tributylamine was added and stirred for degassing under reduced pressure for an hour. The resulting mixture was filtered using 3 μm Teflon (registered trademark) filter and then was introduced to a mold over 4 hours. This mold was kept warm at 30° C. for 10 hours and then temperature of the mold was increased from 30° C. to 120° C., while polymerizing the mixture for 20 hours. When polymerization was finished, the mold was slowly cooled and a resin was taken out of the mold. The thus-obtained resin was anneal-treated at 120° C. for 3 hours to obtain a resin plate (thickness of 5 mm).

Incidentally, in order to remove the internal mold release agent attached to the surface, before conducting evaluation to be described later, the resin plate produced in Production Examples 10 to 14 was dipped in 1 weight % NaOH aqueous solution for 20 minutes, and then sufficiently washed and dried at room temperature.

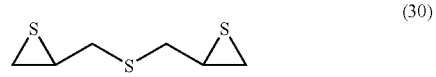

Example 16

4.0 g (solid content 0.8 g) (171 weight parts as dispersion) of 20% MIBK dispersion of silicon dioxide having a particle diameter of 10 to 20 nm obtained in Production Example 9, 1.17 g (50 weight parts) of bis-2-acryloylthioethyl sulfide, 1.17 g (50 weight parts) of pentaerythritol triacrylate isophorone diisocyanate urethane pre-polymer (Kyoeisha Chemical Co., Ltd., a product name: UA-3061) and 0.2 g (9 weight parts) of acrylic acid were mixed, and then 3.0 g (128 weight parts) of toluene was added thereto. Furthermore, 0.07 g (3 weight parts) of 2,4,6-trimethylbenzoyl-diphenyl-phophine oxide (TMDPO) as a photo-initiator was added thereto, and the resulting solution was sufficiently stirred to produce a composition for coating. Then, evaluation was conducted in a method as described later.

Examples 17 to 22

Each composition for Examples 17 to 22 was produced in the same manner as in Example 16, except that compositions shown in Table 2 ware used instead. Then, evaluation was conducted in a method as described later.

Comparative Example 8

A coating composition was produced without adding 20% MIBK dispersion of silicon dioxide having a particle diameter of 10 to 20 nm in Example 1 and then evaluation was conducted in a method as described later.

Comparative Example 9

The same coating composition was produced, except that bis-2-acryloylthioethyl sulfide in Example 1 was changed to bis-2-acryloyloxyethyl ether (diethylene glycol diacrylate; a reagent of Aldrich Co.) and then evaluation was conducted in a method as described later.

Comparative Example 10

The same coating composition was produced, except that bis-2-acryloylthioethyl sulfide in Example 1 was changed to trimethylol propane triacrylate (Kyoeisha Chemical Co., Ltd.; a product name: Light Acrylate TMP-A) and then evaluation was conducted in a method as described later.

Evaluation of a hard coating composition was conducted in the following manner.

Each of Examples 16 to 22 and Comparative Examples 8 to 10 was coated on the resin plate in Production Examples 10 to 14 by spin coat, dried at 40° C. for a minute in a hot air drier and then thereon was irradiated a metal halide lamp (light intensity: 118 mW/cm$^2$ in a wavelength of 365 nm) for 20 seconds, thus forming a hard coat film having a thickness of 2 μm. Incidentally, the thickness was confirmed according to the surface profiler (DekTakIII, a product of Ulvac, Inc.). Incidentally, the results of evaluation were indicated in Table 2.

(7) Adherence Test

The cross-hatch, tape-peeling test (JIS K5400) was conducted for a film-attached sample produced on the resin plates obtained by Production Examples 10 to 14 using each of Examples 16 to 22 and Comparative Examples 8 to 10. On the surface of a coating layer-attached base material was calibrated and made cut in with a cutter knife at an interval of 2 mm to form 25 scale cells of 4 mm$^2$ using a cutter guide (JIS K5400 Rule). Thereon was strongly attached a cellophane adhesive tape (JIS Z1522 Rule) and which was then rapidly pulled for counting scale cells remained on the coating layer.

Evaluation Score
10: No peel-off
8: Peel-off in a defect part: within 5% of the total
6: Peel-off in a defect part: within 5% to 15% of the total
4: Peel-off in a defect part: within 15% to 35% of the total
2: Peel-off in a defect part: within 35% to 65% of the total
0: Peel-off in a defect part: more than 65% of the total

(8) Pencil Hardness Test

A test based on the handwriting method corresponding to JIS-K5400 was performed for a film-attached sample produced on the resin plate obtained by Production Example 10 using each of Examples 16 to 22 and Comparative Examples 8 to 10.

Evaluation was conducted by scratches on a coating layer using the pencil of a hardness ranging from 9H to 6B.

(9) Scratch Resistivity Test

A coating layer-attached sample produced on the resin plate obtained by Production Example 10 using each of Examples 16 to 22 and Comparative Examples 8 to 10 was loaded with a steel wool (a product of Nippon Steel Wool Co., Ltd.) numbered 0000 of 200 g to come and go 10 times for rubbing the surface, and the degree of scratch was visually determined in the following steps.

A: No scratch in the range of 1 cm×3 cm
B: 1 to 10 scratches in the above range
C: 10 to 30 scratches in the above range
D: Countless scratches in the above range

(10) Light Resistance Test

A coating layer-attached sample produced on the resin plate obtained by Production Example 10 using each of Examples 16 to 22 and Comparative Examples 8 to 10 was irradiated using a solar simulator for 200 hours, and then the peel-off test was conducted for investigation of the status before and after irradiation.

○ . . . No change in adherence
Δ . . . Deterioration of adherence slightly
x . . . Deterioration of adherence greatly

(11) Appearance, Transparency

In a coating layer-attached sample produced on the resin plate obtained by Production Example 10 using each of Examples 16 to 22 and Comparative Examples 8 to 10, appearance was visually measured and the permeability(or transparency) between 400 nm and 600 nm was measured by the uv-vis spectrophotometer (Shimadzu UV2200).

○ . . . Over 90% transparency between 400 nm and 600 nm
Δ . . . 80 to 90% transparency between 400 nm and 600 nm
x . . . Less than 80% transparency between 400 nm and 600 nm The results were ○ in all of the cases.

(12) Storage Stability (pot life) of a hard Coating composition

Each of compositions in Example 16 to 22 and Comparative Examples 8 to 10 was put into a brown sample bottle for sealing completely, and then kept still standing at a darkroom for a month at room temperature or for 6 months at 4° C., to investigate its change.

○ . . . No gelation of a solution and no change in the viscosity
Δ . . . No gelation of a solution, but change in the viscosity
x . . . Gelation of a solution The results were ○ (No gelation of a solution and no change in the viscosity) both at room temperature and at 4° C.

TABLE 2

| | | | Remarks | Example 16 | Example 17 | Example 18 | Example 19 | Example 20 |
|---|---|---|---|---|---|---|---|---|
| Composition | (a) | thioacrylate-1 | *1) | 50 | | | | |
| | Component | thioacrylate-2 | *2) | | | | | 50 |
| | thioacrylate | thioacrylate-3 | *3) | | 50 | | | |
| | | thioacrylate-4 | *4) | | | 50 | | |
| | | thioacrylate-5 | *5) | | | | 50 | |
| | Acrylate | Acrylic acid | | 9 | 9 | 9 | 9 | 9 |
| | | Dietylene glycol diacrylate | | | | | | |
| | | TMP-A | *9) | | | | | |

TABLE 2-continued

|  |  |  |  |  |  |  |  |
|---|---|---|---|---|---|---|---|
| (b) Component Dispersion (solid content) | ZrO2 (solid content 20%) | Production Example 2 |  |  |  |  |  |
|  | ZrO2—TiO2 (solid content 20%) | Production Example 3 |  |  |  |  |  |
|  | SiO2 (solid content 20%) | Production Example 9 | 171 (34) | 171 (34) | 171 (34) | 171 (34) | 171 (34) |
| (c) Component Urethane acrylate | UT-1 | *6) |  |  | 50 |  |  |
|  | UT-2 | *10) | 50 | 50 |  | 50 | 50 |
| Initiator | TMDPO |  | 3 | 3 | 3 | 3 | 3 |
| Solvent | Methylcellosolve |  |  |  |  |  |  |
|  | Toluene |  | 128 | 128 | 128 | 128 | 128 |
| (a):(c) | Weight/weight |  | 50:50 | 50:50 | 50:50 | 50:50 | 50:50 |
| (b) Ratio | b/(a + b + c) component (%) | b: solid content | 25.3 | 25.3 | 25.3 | 25.3 | 25.3 |
| Total | Weight parts |  | 411 | 411 | 411 | 411 | 411 |
| Evaluation Results | (7) Adherence Test | thiourethane Production Example 10 | 10 | 10 | 10 | 10 | 10 |
|  |  | thiourethane Production Example 11 | 10 | 10 | 10 | 10 | 10 |
|  |  | thiourethane Production Example 12 | 10 | 8 | 10 | 10 | 8 |
|  |  | episulfide Production Example 13 | 10 | 10 | 10 | 10 | 10 |
|  |  | episulfide Production Example 14 | 10 | 10 | 10 | 10 | 10 |
|  | (8) Pencil Hardness Test |  | 5H | 5H | 5H | 5H | 4H |
|  | (9) Scratch Resistivity Test |  | A | A | A | A | A |
|  | (10) Light Resistance Test |  | ○ | ○ | ○ | ○ | ○ |

|  |  |  | Example 21 | Example 22 | Comparative Example 8 | Comparative Example 9 | Comparative Example 10 |
|---|---|---|---|---|---|---|---|
| Composition | (a) Component thioacrylate | thioacrylate-1 | 50 | 50 | 50 |  |  |
|  |  | thioacrylate-2 |  |  |  |  |  |
|  |  | thioacrylate-3 |  |  |  |  |  |
|  |  | thioacrylate-4 |  |  |  |  |  |
|  |  | thioacrylate-5 |  |  |  |  |  |
|  | Acrylate | Acrylic acid |  |  | 9 | 9 | 9 |
|  |  | Dietylene glycol diacrylate |  |  |  | 50 |  |
|  |  | TMP-A |  |  |  |  | 50 |
|  | (b) Component Dispersion (solid content) | ZrO2 (solid content 20%) | 171 (34) |  |  |  |  |
|  |  | ZrO2—TiO2 (solid content 20%) |  | 171 (34) |  |  |  |
|  |  | SiO2 (solid content 20%) |  |  |  | 171 (34) | 171 (34) |
|  | (c) Component Urethane acrylate | UT-1 |  |  |  |  |  |
|  |  | UT-2 | 50 | 50 | 50 | 50 | 50 |
|  | Initiator | TMDPO | 3 | 3 | 3 | 13 | 13 |
|  | Solvent | Methylcellosolve | 128 | 128 |  |  |  |
|  |  | Toluene |  |  | 128 | 128 | 128 |
|  | (a):(c) | Weight/weight | 50:50 | 50:50 | 50:50 | — | — |
|  | (b) Ratio | b/(a + b + c) component (%) | 25.3 | 25.3 | 25.3 | 0 | 0 |
|  | Total | Weight parts | 411 | 411 | 411 | 411 | 411 |
| Evaluation Results | (7) Adherence Test | thiourethane | 8 | 8 | 0 | 10 | 0 |
|  |  | thiourethane | 8 | 8 | 0 | 10 | 0 |
|  |  | thiourethane | 8 | 8 | 0 | 10 | 0 |
|  |  | episulfide | 8 | 8 | 0 | 10 | 0 |
|  |  | episulfide | 8 | 8 | 0 | 10 | 0 |
|  | (8) Pencil Hardness Test |  | 4H | 4H | 4H | H | 4H |
|  | (9) Scratch Resistivity Test |  | B | B | C | D | B |
|  | (10) Light Resistance Test |  | ○ | ○ | — | ○ | — |

*1) bis-2-acryloylthioethyl sulfide
*2) 1,4-bisacryloylthio benzene
*3) 1,2-bisacryloylthio eta isophorone diisocyanate urethane pre-polymer (a product of Kyoeisha Chemical Co., Ltd.)
*4) (1,2-bis(2-acryloylthioethylthio)-3-acryloylthio propane
*5) bis-(2-acryloylthioethylthio-3-acryloylthio propyl) sulfide
*6) UT-1: pentaerythritol triacrylate-hexamethylene diisocyanate urethane pre-polymer (a product of Kyoeisha Chemical Co., Ltd.
*9) TMP-A: trimethylol propane triacrylate (a product of Kyoeisha Chemical Co., Ltd.)
*10) UT-2: pentaerythritol triacrylate

4. Production and Evaluation of an Optical Material containing a Composition of the Present Invention

Example 23

A methanol dispersion of 20% solid content weight of ultrafine zirconium oxide-coated titanium oxide particles as ultrafine inorganic particles was first obtained in the same manner as in Production Example 3. Furthermore, methanol was changed to 2-hydroxyethyl methacrylate (HEMA) by the concentration method, thus producing 30% solid content weight. At this time, the solution tended to be gelated. Acetyl acetone of 20 weight % to the ultrafine inorganic particle weight was added and sufficiently stirred. Even when the solution was slowly peptized and even left at room temperature since then, no gelation was shown. 5.0 g (HEMA: 70 weight parts, ultrafine inorganic particles: 30 weight parts, acetyl acetone: 6 weight parts) of the HEMA ultrafine inorganic particle dispersion was taken and 1.65 g (35 weight parts) of bis-2-acryloylthioethyl sulfide and 0.05 g (1 weight part) of 2,4,6-trimethylbenzoyl-diphenyl-phosphine oxide (TMDPO) as a photo-initiator were added thereto and sufficiently stirred. The resulting mixture was filtered using 1 μm Teflon (registered trademark) filter and then introduced to a mold comprising a glass mold and a gasket. Thereon was irradiated a metal halide lamp of 120 W/cm type (light intensity: 118 mW/cm$^2$ in a wavelength of 365 nm) for 60 seconds. As a result, a transparent resin plate having a thickness of 1 mm was obtained. An average permeability of the thus-obtained resin plate was 82.3%. As a result of measurement using the Abbe refractometer, the refractive index (E line) was 1.69 and Abbe number was 30.

Examples 24 to 28

Each composition as described in Examples 24 to 28 was produced in the same manner as in Example 23, except that compositions shown in Table 3 were used instead, and then evaluation was conducted.

INDUSTRIAL APPLICABILITY

A resin composition of the present invention comprises a thio(meth)acrylate compound and ultrafine inorganic particles as essential components, enables control of the refractive index as intended by curing with ultraviolet rays, and can be formed into a coating layer superior in scratch resistivity. Thus, it can be used as a coating agent or optical material fields. More specifically, it is useful for hard coatings of spectacle lens having high refractive index; anti-reflective purposes for plasma display, liquid crystal display, EL display and the like; high refractive index film for reading and writing high density recording optical media; optical parts such as optical filters and the like; or usages for a surface coating agent and the like aiming at improving design of plastic materials, metal materials, ceramic materials, glass materials and the like.

In particular, as adherence even to the surface of a resin having a thio urethane bond or epithiosulfide bond and hardness are excellent, the composition can be widely applied to hard coat agents of lenses such as spectacle lenses, camera lenses, pickup lenses of devices for optical recording and reproduction.

What is claimed is:

1. A composition comprising (a) a thio(meth)acrylate compound represented by the formula (1), (b) ultrafine inorganic particles, (d) one or more hydroxyl group-containing (meth)acrylate compounds represented by the formulae (7) to (10), and (e) a β-diketone compound represented by the formula (11):

TABLE 3

| | | | Remarks | Example 23 | Example 24 | Example 25 | Example 26 | Example 27 | Example 28 |
|---|---|---|---|---|---|---|---|---|---|
| Composition | (a) Component | thioacrylate-1 | *1) | 35 | 17.5 | 35 | 35 | 35 | 35 |
| | | thioacrylate-2 | *2) | | 17.5 | | | | |
| | (b) Component | ZrO2—TiO2 (solid content 100%) | Production Example 3 | 30 | 30 | 30 | | 30 | 30 |
| | | SnO2—ZrO2—Sb2O5 (solid content 100%) | *11) | | | | 30 | | |
| | (d) Component OH group-containing (meth)acrylate | 2-hydroxyethyl methacrylate | | 70 | 70 | | 70 | 20 | 30 |
| | | 3-hydroxypropyl methacrylate | | | | 70 | | | |
| | | 2-hydroxy-3-aryloyloxy propyl methacrylate | | | | | | 50 | |
| | | pentaerythritol triacrylate | | | | | | | 40 |
| | (e) Component β-diketones | acetyl acetone | | 6 | | 6 | 6 | 6 | 6 |
| | | 3-methyl-2,4-pentadion | | | 6 | | | | |
| | Initiator | TMDPO | | 1 | 1 | 1 | 1 | 1 | 1 |
| | (a):(d) | Weight/weight | | 33:67 | 33:67 | 33:67 | 33:67 | 33:67 | 33:67 |
| | (b) Ratio | b/(a + b + d) component (%) | b: Solid content | 22 | 22 | 22 | 22 | 22 | 22 |
| | Total | Weight parts | | 142 | 142 | 142 | 142 | 142 | 142 |
| Evaluation Results | | Transparency | | 82.3 | 81.8 | 82.2 | 80.2 | 81.8 | 81.7 |
| | | Refractive Index (E line) | | 1.69 | 1.69 | 1.69 | 1.65 | 1.69 | 1.68 |
| | | Abbe number | | 30 | 28 | 30 | 39 | 28 | 27 |

*1) bis-2-acryloylthioethyl sulfide
*2) 1,4-bisacryloylthio benzene
*11): Ultrafine SnO2—ZrO2—Sb2O5 mixed oxide particles (a product of Nissan Chemicals, Ltd., HX-300M1)

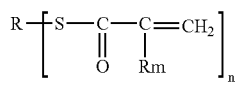
(1)

wherein a linking (or connecting) group R represents one of the formulae (2), (3), (5) and (6):

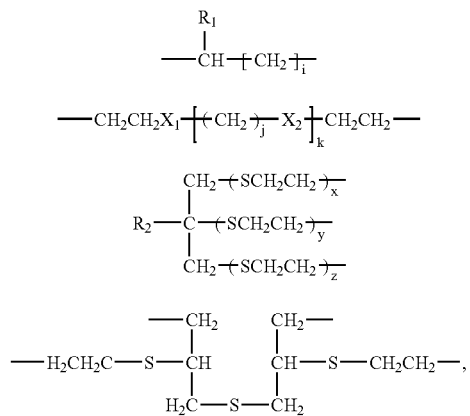

wherein, in formula (1), $R_m$ represents each independently a hydrogen atom or a methyl group; n is an integer of 2 to 4; $R_1$ is a hydrogen atom or a methyl group; $R_2$ represents a hydrogen atom, a methyl group or an ethyl group; $X_1$ and $X_2$ represent oxygen atoms or sulfur atoms; i is an integer of 1 to 5; j is an integer of 0 to 2; and k, x, y and z are each independently 0 or 1:

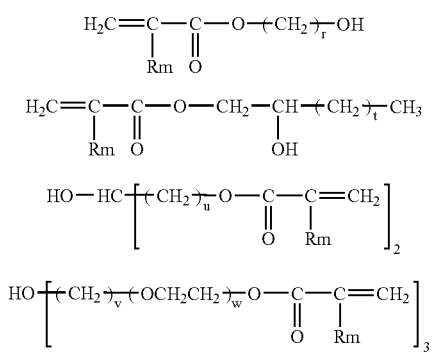

wherein, in formulae (7) to (10), $R_m$ represents a hydrogen atom or a methyl group; r and t are each an integer of 1 to 4; u is each independently an integer of 1 to 4; v is each independently an integer of 1 to 4; w is each independently an integer of 0 to 4:

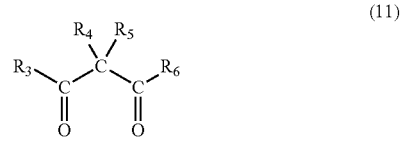

wherein, formula (11), $R_4$ and $R_5$ represent hydrogen atoms or such ones that one is a hydrogen atom and another is a straight chain or branched $C_1$ to $C_4$ alkyl group; $R_3$ and $R_6$ represent hydrogen atoms or each independently a hydrogen atom, a $C_1$ to $C_4$ alkyl group, a hydroxyl group, an aliphatic residue, an aromatic residue, an alicyclic residue, a heterocyclic residue, or $C_1$ to $C_6$ alkyl group containing one or more ether groups, ester groups, thioester groups or ketone groups in the chain structure; or $R_3$ and $R_5$ may be combined together to form $C_5$ to $C_{10}$ rings which may be substituted with one or more $C_2$ to $C_4$ alkylene groups.

2. The composition according to claim 1, further comprising (c) a (meth)acrylate compound having a (thio)urethane bond.

3. The composition according to claim 2, wherein a layer of the composition having a thickness of 2 μm coated on the surface of a resin plate having a thiourethane bond or an epithiosulfide bond and then cured with ultraviolet rays has (1) an evaluation score of a cross-hatch, tape-peeling test (JIS-K5400) of 6 or more; and (2) a pencil scratch test value (JIS-K5400) of 3H or more.

4. A coating composition comprising the composition as described in claim 3.

5. An optical material comprising the composition as described in claim 3.

6. The composition according to claim 1, wherein a layer of the composition having a thickness of 2 μm coated on the surface of a resin plate having a thiourethane bond or an epithiosulfide bond and then cured with ultraviolet rays has (1) an evaluation score of a cross-hatch, tape-peeling test (JIS-K5400) of 6 or more; and (2) a pencil scratch test value (JIS-K5400) of 3H or more.

7. A coating composition comprising the composition as described in claim 1.

8. An optical material comprising the composition as described in claim 1.

* * * * *